(12) United States Patent
Livingston et al.

(10) Patent No.: US 9,321,432 B2
(45) Date of Patent: Apr. 26, 2016

(54) AUTOMATIC HEIGHT ADJUSTING VEHICLE ROOF CLEANER

(71) Applicant: Quintin Machinery LLC, Lancaster, PA (US)

(72) Inventors: Howard Livingston, Lancaster, PA (US); Joel D. McCorkel, York, PA (US)

(73) Assignee: Quintin Machinery LLC, Lancaster, PA (US)

(*) Notice: Subject to any disclaimer, the term of this patent is extended or adjusted under 35 U.S.C. 154(b) by 45 days.

(21) Appl. No.: 14/178,786

(22) Filed: Feb. 12, 2014

(65) Prior Publication Data
US 2014/0223677 A1    Aug. 14, 2014

Related U.S. Application Data

(60) Provisional application No. 61/764,831, filed on Feb. 14, 2013.

(51) Int. Cl.
*B60S 3/04* (2006.01)

(52) U.S. Cl.
CPC ........................................ *B60S 3/04* (2013.01)

(58) Field of Classification Search
CPC ............... B60S 3/04; B60S 1/66; Y10S 15/02
USPC ............................. 15/97.3, DIG. 2, 53.1, 53.3
See application file for complete search history.

(56) References Cited

U.S. PATENT DOCUMENTS

| | | |
|---|---|---|
| 1,411,949 A | 4/1922 | Wilson |
| 1,492,894 A | 5/1924 | Perego |
| 1,611,273 A | 12/1926 | Kelso |
| 1,864,821 A | 6/1932 | Heuze |
| 2,215,692 A | 9/1940 | Fleming |
| 2,708,446 A | 5/1955 | Phillips |
| 3,072,131 A | 1/1963 | Di Laurenzio |
| 3,104,406 A | 9/1963 | Rhodes |
| 3,439,372 A | 4/1969 | Collier |
| 3,459,203 A | 8/1969 | Pritchard |
| 5,076,304 A | 12/1991 | Matthews |
| 5,160,430 A | 11/1992 | Gasser et al. |
| 5,245,771 A | 9/1993 | Walsh |
| 5,450,815 A | 9/1995 | Krehl et al. |
| 5,802,654 A | 9/1998 | Yeaglin |
| 5,989,356 A | 11/1999 | Candeletti |
| 6,453,500 B1 | 9/2002 | Schmitt |
| 6,654,978 B2 | 12/2003 | Bouchard |
| 7,617,561 B2 | 11/2009 | Couture |
| 8,333,845 B2 | 12/2012 | Wentworth et al. |
| 8,584,295 B1 | 11/2013 | Yeaglin |

(Continued)

OTHER PUBLICATIONS

Website—www.durasweeper.com, downloaded Oct. 13, 2015, 7 pages.

(Continued)

*Primary Examiner* — Laura C Guidotti
(74) *Attorney, Agent, or Firm* — Barley Snyder

(57) ABSTRACT

A vehicle roof cleaner is provided with a pair of vertical supports, an upper cross bar, a cleaner assembly, and an adjustment mechanism. The upper crossbar connects the pair of vertical supports, and the cleaner assembly is movable along the pair of vertical supports and positionable below the upper crossbar by the height adjustment mechanism. The height adjustment mechanism includes a load bearing mechanism, a spring load assembly, and an activation mechanism.

26 Claims, 7 Drawing Sheets

(56) References Cited

U.S. PATENT DOCUMENTS

| | | |
|---|---|---|
| 2003/0051302 A1 | 3/2003 | Fazio |
| 2007/0174981 A1 | 8/2007 | Smith et al. |
| 2009/0199880 A1 | 8/2009 | Wentworth et al. |
| 2009/0217944 A1 | 9/2009 | Munera et al. |
| 2009/0282630 A1 | 11/2009 | Reed |
| 2009/0282708 A1 | 11/2009 | Reed |
| 2010/0017979 A1 | 1/2010 | Ennis |

OTHER PUBLICATIONS

Website—www.trynexfactory.com/sweepex.htm, copyright 2010-2015, Douglas Dynamics, LLC, downloaded Oct. 13, 2015, 3 pages.

AUTOMATIC HEIGHT ADJUSTING VEHICLE ROOF CLEANER

CROSS-REFERENCE TO RELATED APPLICATIONS

This application claims the benefit of the filing date under 35 U.S.C. §119(a)-(d) of Provisional Patent Application No. 61/764,831, filed Feb. 14, 2013.

FIELD OF THE INVENTION

The invention is related to a vehicle roof cleaner and more specifically to an automatic height adjusting vehicle roof cleaner.

BACKGROUND

It is not an uncommon experience in localities which experience significant snowfall to see a slab of snow fly off the roof of a passenger car or van and strike a following vehicle. Regardless of the vehicle from which the snow is released, the experience is startling to the driver behind. However, if the snow or ice come loose from atop a truck, large semi-trailer, bus, van or other type of large vehicle, the event can be very dangerous.

This has always been a concern of the trucking industry. Therefore, trucking companies spend considerable money to clear snow and ice from the roofs of trailers after every major snow storm. This effort not only requires money but also takes significant time, so that the operation of the trucks of a large fleet can be delayed significantly after a snowstorm. Furthermore, since the snow and ice removal has generally been done manually by workers shoveling from atop the trailers, employers and insurance companies are very concerned about the danger of such workers slipping and falling from the typically 13 foot high trailer roofs. Furthermore, at least one state, New Jersey, requires that such roof snow and ice be cleared before a truck moves onto a public road, but even without such requirements, there is a significant increase in fuel consumption, and therefore an increase in the cost of operation, if snow or ice is not removed.

Several devices exist to attack this problem. U.S. Pat. No. 5,802,654, discloses an immovable bridge like structure supporting a vertically adjustable wedge shaped plow that vehicles can move under to have snow or ice removed. U.S. Pat. No. 5,989,356 uses a snow removal scraper supported on a pillar installed on cement footings.

Published Patent Application U.S. 2009/0282708 discloses a structure that is not imbedded in the ground, but instead is held down by four removable concrete blocks which rest on two base plates attached at the bottom of the vertical supports of the bridge like structure. The snow scraper structure can then be moved to a storage location when not in use. This is accomplished by using two forklifts vehicles with 5000 pound capacity. The forklifts first lift each of the 3 ton concrete blocks off the base plate. Then, by inserting their forks into pockets within the two base plates at the bottom of opposite sides of the bridge structure, the two forklifts work in tandem to move the structure. This is no easy task since the structure weights 8,800 pounds, is over 16 feet tall, and is approximately 17 feet wide.

While all of these solutions have been geared toward semi trailers in response to the needs of the trucking industry, there remains a need to efficiently adjust a cleaner assembly to remove snow and ice from the roof tops of other type of trucks, buses and other large vehicles.

A problem exists with these structures in that their plow designs are not always suitable for scraping snow from various types of vehicle roofs, and manual adjustment of the plow is inefficient and may damage the vehicle roof. For such plows, even where they include a protective strip along the edge which engages the vehicle roof top, damage to the vehicle roof may occur since a manual adjustment may not deter forceful placement of the plow upon the roof.

SUMMARY

The invention provides a vehicle roof cleaner having a pair of vertical supports, an upper cross bar, a cleaner assembly, and an adjustment mechanism. The upper crossbar connects the pair of vertical supports, and the cleaner assembly is movable along the pair of vertical supports and positionable below the upper crossbar by the height adjustment mechanism. The height adjustment mechanism includes a load bearing mechanism, a spring load assembly, and an activation mechanism.

BRIEF DESCRIPTION OF THE DRAWING

The invention will now be described by way of example with reference to the accompanying figures of which.

DETAILED DESCRIPTION OF THE EMBODIMENT(S)

Figure 1:
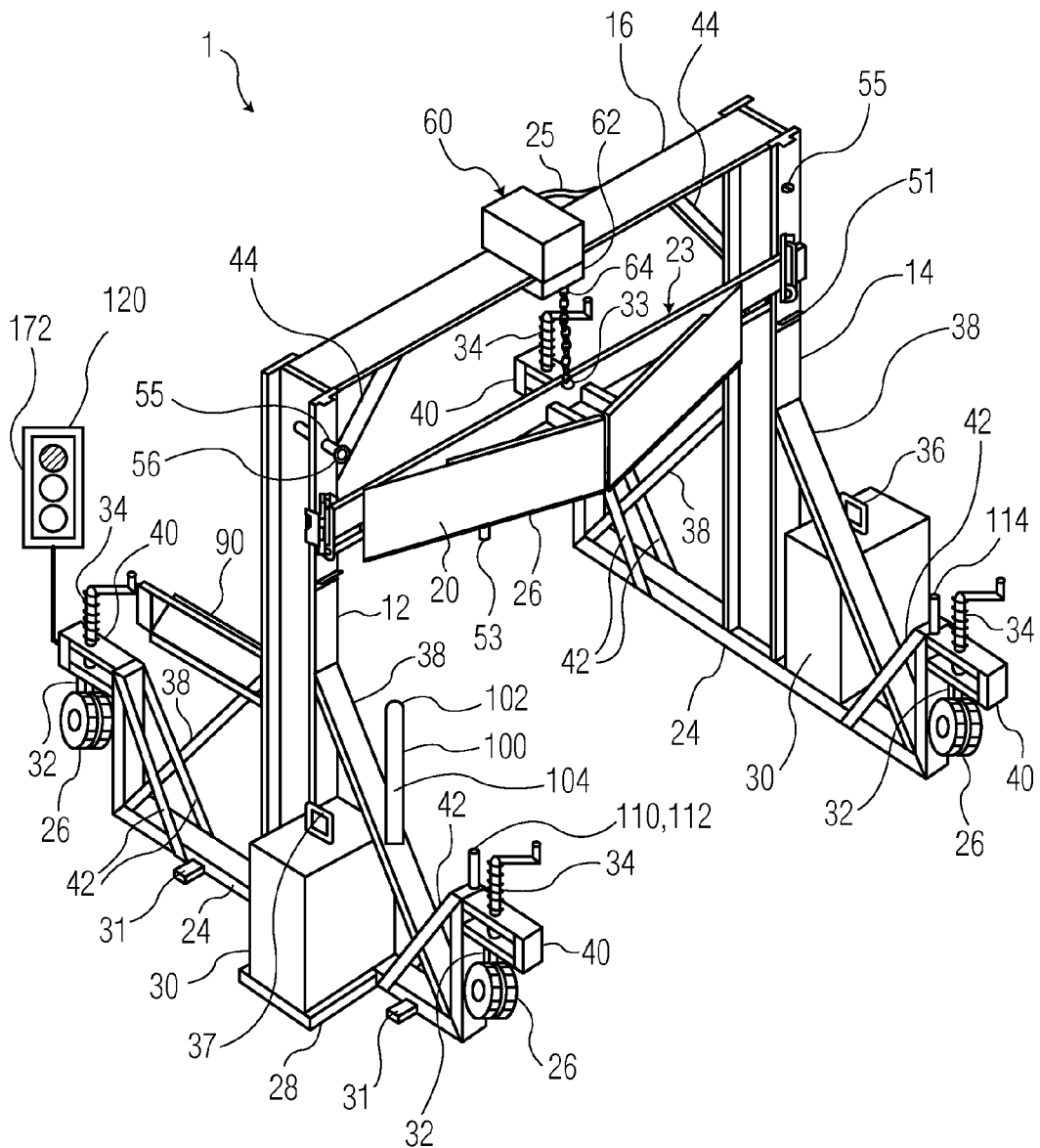
FIG. 1 is a front perspective view of the an embodiment of the invention.

Referring first to FIG. 1 an exemplary embodiment a vehicle roof cleaner 1 according to the invention is shown. The vehicle roof cleaner 1 generally includes a support structure 10, a cleaner assembly 20, and a height adjustment mechanism 60.

In the shown embodiment, the support structure 10 generally includes a pair of base structures 24, a pair of vertical supports 12 and 14, an upper cross piece 16.

Each base structure 24 is a solid platform capable of stabilizing the vehicle roof cleaner 1 on a support surface, such as paved roadway. In the embodiment shown, each base structure 24 includes an elongated planar support 24a with a set of retractable wheels 26 connected to the elongated planar support 24a. In the shown embodiment, each base structure 24 also includes a platform 28 so that when the wheels 26 are retracted, as shown in FIG. 1, the base structures 24 sit on the support surface. Each platform 28 is an additional planar support 24a having a ballast receiving section 28a. The platform 28 rigidly attaches to the planar support 24a in the embodiment shown.

When the vehicle roof cleaner 1 is in use clearing snow, ballasts 30, typically made of concrete, are placed in the ballast receiving section 28a of the platforms 28 to prevent movement of vehicle roof cleaner 1 as a vehicle moves through it for snow and ice clearing. Additional means to prevent such movement of the structure are plates 31, which are attached to base structures 24, and include holes through which locking devices such as stakes or other devices can be inserted into the support surface.

In the shown embodiment, the pair of base structures 24 are positioned substantially parallel to each other, and the ballasts 30 are symmetrically positioned with respect to each other. However, one skilled in the art should appreciate that other design configurations are possible, so long as the configurations do not depart from the spirit of the invention.

As shown, the pair of base structures 24 include a total of four sets of dual wheels 26 mounted on swivel casters 32 that are held at the ends of base structures 24 by jack supports 40. Therefore, once the wheels 26 are lowered and lift the structure, the vehicle roof cleaner 1 can be moved in any direction. Wheels 26 and casters 32 are mounted on trailer type wheel jacks 34, and each jack 34 is rated for 5,000 pound lifting capacity.

If the vehicle roof cleaner 1 is to be moved, ballasts 30 are removed from platforms 28 using lifting hooks 37 or some other lifting structure. The removal of the ballasts 30 can easily be accomplished by a small fork lift. Then wheels 26 are lowered using wheel jacks 34, thereby raising the vehicle roof cleaner 1 so that base structures 24 are typically about 2 inches off the ground. In the embodiment, the ballasts 30 each weigh about 2,000 pounds, and when the ballasts 30 are removed, the vehicle roof cleaner 1 weighs about 4,300 pounds.

As shown in FIG. 1, jack stabilizers 42, which are attached between jack supports 40 and the base structures 24, are provided and stabilize the jacks 34, casters 32, and wheels 26. Therefore, the vehicle roof cleaner 1 will not distort or tip either when it is functioning to remove snow and ice or when it is being moved. This stability holds even when the unit is in service upon or being moved on a rough stone surface.

With reference to FIG. 1, each of the pair of vertical supports 12, 14 is an elongated rigid member extending upward from the support surface. In the shown embodiment, each vertical support 12, 14 is an "I" vertical supports made from a rigid material, such as metal. However, it is possible in other embodiments, that each vertical support 12, 14 has a different design structure than the traditional "I" beam design, or could be prepared from other rigid materials capable of supporting the vehicle roof cleaner 1.

More particularly, in the shown embodiment, the vertical supports 12 and 14 are attached to the base structures 24. However, it is possible, in other embodiments where the vehicle roof cleaner 1 is not mobile, each vertical support 12, 14 can be rigidly positioned upon the support surface. For instance, each vertical support 12, 14 may be construed with a footing that is embedded in the support surface.

As shown, a pair of stabilizing supports 38 are positioned between the vertical supports 12, 14 and the base structures 24, in order to prevent motion between them. Each stabilizing support 38 is an elongated rigid member that extends between and attaches to the vertical support 12, 14 and the adjacent base structure 24.

With reference to FIG. 1, the upper cross piece 16 is an elongated rigid member extending between and rigidly attaching the pair of vertical supports 12, 14. When extending between the vertical supports 12, 14, the upper cross piece 16 forms an overhead bridge structure.

In the shown embodiment, the vertical supports 12 and 14 extend approximately twenty feet above ground. They are also separated by a distance sufficient to easily move a vehicle, such as a typical semi-trailer, there between. It should be understood by those reasonably skilled in the art that the height and width may be adjusted to accommodate various size vehicles.

The function of upper cross piece 16 is to support the height adjustment mechanism 60, as well as the cleaner assembly 20. Therefore, the upper cross piece 16 should be sufficiently rigid enough to support the cleaner assembly 20, which is supported by the chain 64 in the shown embodiment. As shown in FIG. 1, a pair of stabilizers 44 are provided and attach between the upper cross piece 16 and the vertical supports 12 and 14 to prevent distortion of the structure.

Figure 3:
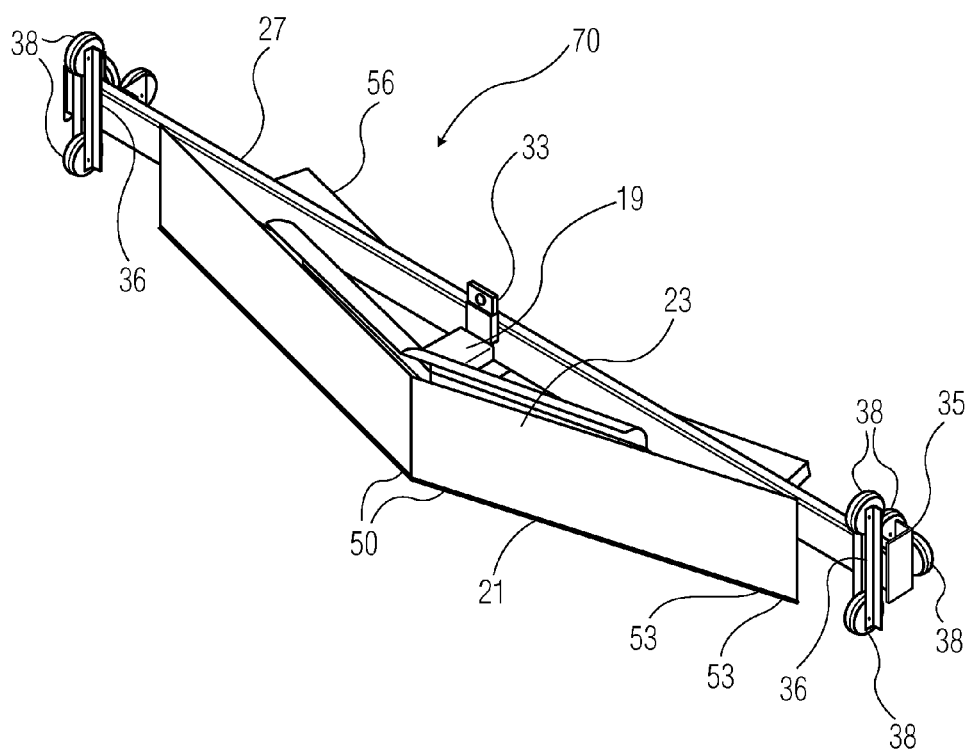
FIG. 3 is a detailed perspective view of a cleaner assembly for the embodiment of FIGS. 1 and 2.

Now with reference to FIGS. 1 and 3, the major components of the cleaner assembly 20 are shown and include a crossbar 27, a plurality of fixtures 35, a plurality of plow wheel assemblies 36, and a plow 23, and protection assemblies 50.

The crossbar 27 is captured between vertical supports 12 and 14 by fixtures 35 attached to the ends of crossbar 27 and wrapped around outer edges of flanges of "I" vertical supports 12 and 14, respectively. Crossbar 27 is spaced from beam flanges by plow wheel assemblies 36. Each wheel assembly includes four wheels 38 located in line, spaced apart, and located at opposite edges of crossbar 27, so that crossbar 27 can roll along the I beam flanges and maintain its original spacing from the flanges as it is raised and lowered by load bearing mechanism 62. The plow 23 is attached to the cross bar 27 at its ends and is also attached to the crossbar 27 though a support member 29 near its center. Protection assemblies 50 are attached to an edge 21 of the plow 23. Such attachment may be by welding, through the use of suitable fasteners or other suitable attachment means. It should also be understood that the plow 23 and protection assemblies 50 may be formed as an integral sub assembly. The plow 23 and protection assembly 50 are arranged in a v-shape to push snow to the sides of the vehicle roof R as it passes under the vehicle roof cleaner 1. It should be understood that alternate shapes for the cleaner assembly 20 are possible. It may be linear, angled to one side, arcuate or other suitable shapes depending upon the desired removal path for snow from the vehicle top.

With reference to FIG. 3, the protection assemblies 50 will now be described in greater detail.

Each protection assembly 50 may be a resilient plastic strip or one or more rows of brushes 53 that extend downward from the plow 23. Each strip or brush 53 may be formed of a material selected to have sufficient stiffness to push snow or ice while having sufficient flexibility to prevent scraping or other damage to the top surface of the vehicle passing through the vehicle roof cleaner 1. For example, the strip or brush 53 may be formed of polypropylene, polyethylene, or other suitable brush materials and may be sized accordingly by a modular arrangement. The strip or brush 53 includes a plate 56 that is secured to a lower surface of the plow 23, through the use of suitable fasteners or other suitable attachment means, such as a weld.

Another feature used to protect the vehicle being cleared of snow or ice is lower stops 51. Lower stops 51 are attached to vertical supports 12 and 14 at a height appropriate for the vehicles being cleared by a particular vehicle roof cleaner 1, so that the selected vehicle being driven under vehicle roof cleaner 1 is not damaged by cleaner assembly 20. Stops 51 are typically installed 13 feet above the ground but clearly could be installed at different heights, and could also be attached by welding, or adjustably by bolts or other fasteners, so that their heights could occasionally be changed.

Upper stop holes 55 are located on the vertical supports 12 and 14 just below the cross piece 16 and are also used for safety purposes. When the vehicle roof cleaner 1 is taken out of service for long periods of time, for instance during summer, the cleaner assembly 20 can be raised to its maximum height and support pins (only one shown) inserted through upper stop holes 55. This arrangement supports the cleaner assembly 20 and takes the weight off of any load bearing mechanism 62 while the cleaner assembly 20 is high above any truck or trailer roofs.

As discussed, the cleaner assembly 20 can be constructed with various heights to accommodate the weather of different regions, it could be constructed with a single angled blade so that snow and ice are pushed off only one side of the vehicle, or it can be constructed with a curved surface at the upper edge to deflect snow and ice downward to assure they do not go over the top of the plow 23. In the shown embodiment, the height adjustment mechanism 60 is used to adjust the cleaner assembly 20 up and down with respect to the cross piece 16 and a vehicle's roof.

Now with reference back to FIGS. 1 and 2, the height adjustment mechanism 60 will be described. The height adjustment mechanism 60 according to the invention generally includes a load bearing mechanism 62, a spring load assembly 70, and an activation mechanism 90.

Figure 2:
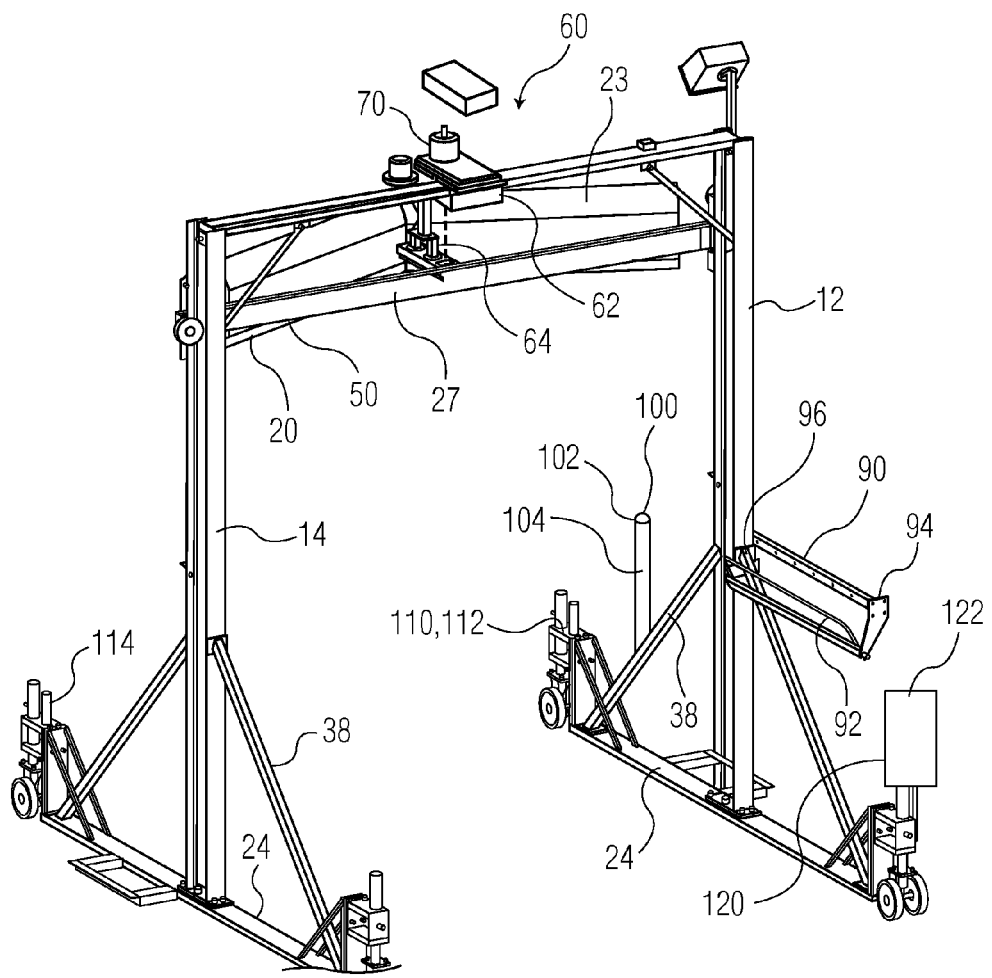
FIG. 2 is a rear perspective view of the embodiment shown in FIG. 1.

As shown in FIGS. 1 and 2, the load bearing mechanism 62 is a hoist in the embodiment shown, and includes a support chain 64 that attaches to the cleaner assembly 20. In particular, the support chain 64 attaches to a support connector 33 of cross bar 27. In the shown embodiment, the load bearing mechanism 62 is a conventional electrically powered winch, which controls take up of the support chain 64. The load bearing mechanism 62 is suspended from the spring load assembly 70 using an eyelet or similar connection device 71 (not See FIG. 5) and connects to a conventional control station having a processor 5 (see FIG. 6) positioned near ground level in the embodiment shown. The load bearing mechanism 62 sends signals to the processor 5, which controls the adjustable height of the cleaner assembly 20.

Figure 4:
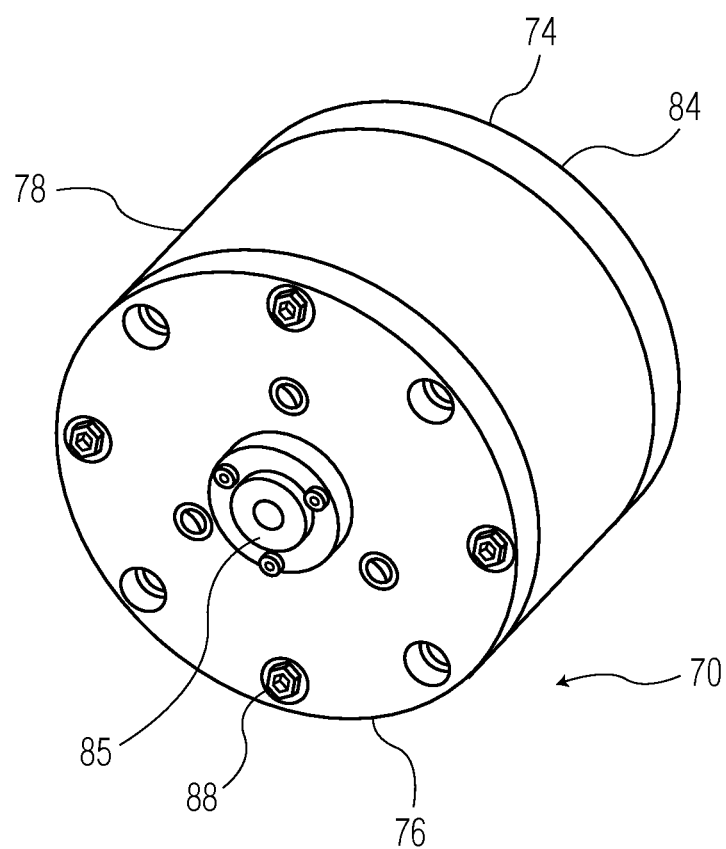
FIG. 4 is a close-up view of a spring load assembly for the embodiment shown in FIGS. 1 and 2.
Figure 5:
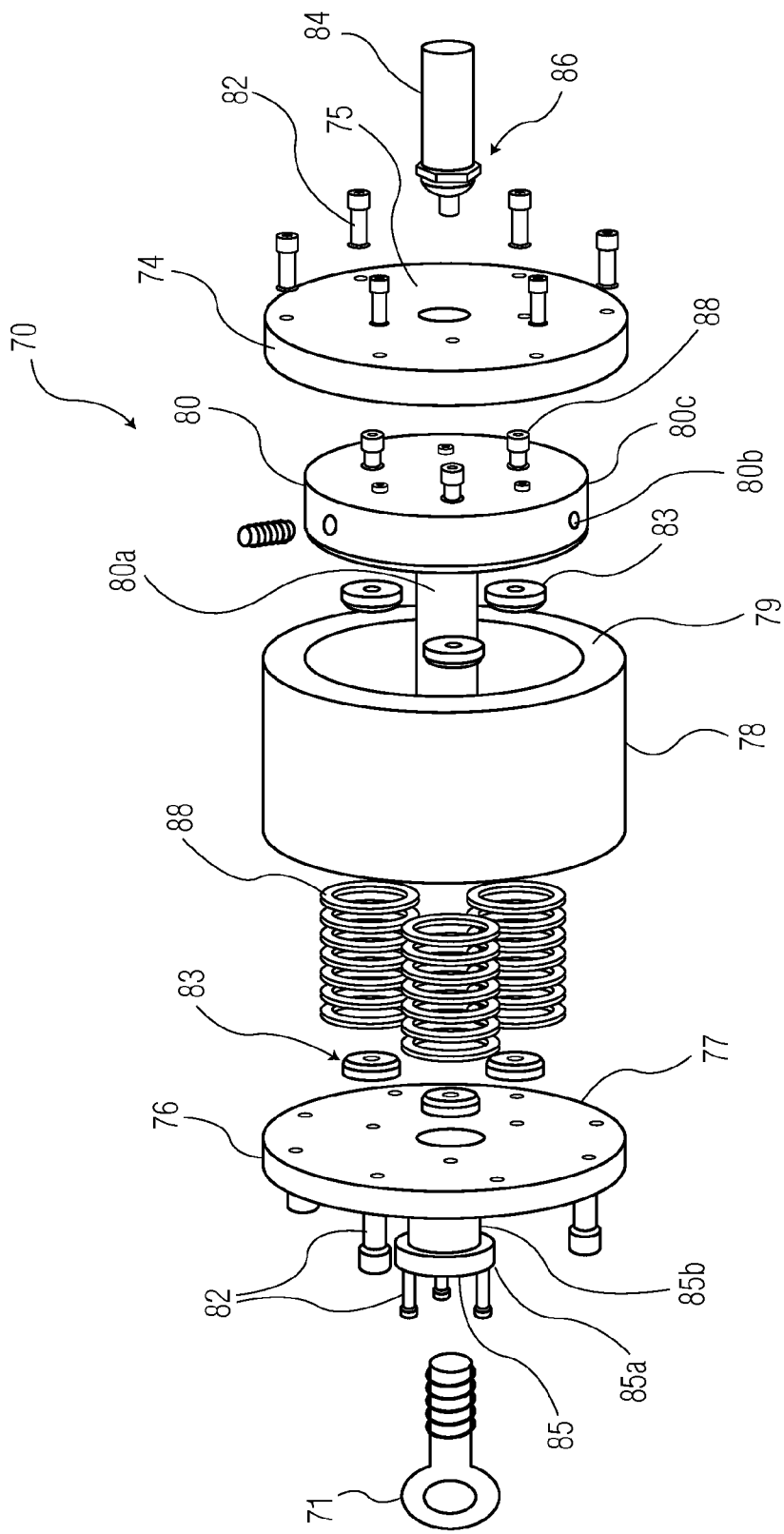
FIG. 5 is an exploded view of the spring load assembly shown in FIG. 4.

With reference to FIGS. 4 and 5, the spring load assembly 70 is shown to generally include a cylindrical housing 72, a piston 80, a plurality of springs 82, a load bearing attachment 85, a shock absorber 84, a proximity sensor 86, and a plurality of fasteners 88.

The cylindrical housing 72 is an assembled housing in the embodiment shown. The cylindrical housing 72 includes a cap 74, a base 76, and piston housing 78. The cap 74 and the base 76 are disc shape members, generally having the same shape and dimensions. Both the cap 74 and the base 76 have a plurality of fastener through holes positioned there through. The cap 74 includes a shock absorber receiving passageway 75, while the base 76 includes a piston shaft receiving passageway 77. The piston housing 78 is a tubular member having a piston receiving passageway 79 with an internal diameter substantially equal or less than a diameter of the piston 80.

The piston 80 is a reciprocating type piston in the shown embodiment. The piston 80 includes a piston shaft 80a, a cylinder 80b, and a plurality of piston rings 80c. The cylinder 80b is a cylindrical member having a diameter less than a diameter of the piston receiving passageway 79 and a plurality of ridges along an outer cylindrical surface for receiving the piston rings 80c. It is possible in other embodiments to remove the piston rings 80c where not needed. The piston shaft 80a extends from a lower major surface of the cylinder 80b and includes a threaded section disposed along a distal end thereof. A diameter of the piston shaft 80a is less than a diameter of the piston shaft receiving passageway, so that the piston shaft 80a can travel back and forth through the piston shaft receiving passageway 77.

As shown in FIGS. 4 and 5, the load bearing attachment 85 is a tubular member having a flange 85a at one end and a shaft receiving connector 85b at another end thereof. In the embodiment shown, the shaft receiving connector 85b is a threaded passageway that connects with the threaded section of the piston shaft 80a. The flange 85a also includes a threaded connector section in the embodiment shown, that connects with the eyelet or similar connection device 71.

As shown in FIG. 5, the shock absorber 84 is filled with hydraulic fluid that absorbers energy to decelerate fast moving loads bringing their speed down to zero. The shock absorber 84 includes a one-piece threaded body and a piston rod, which automatically returns to its extended position. The shock absorber 84 includes a connector, such as hex jam nut for mounting onto the cap 74 through the shock absorber receiving passageway 75.

In the shown embodiment, a proximity sensor 86 is positioned adjacent or integrally constructed with the shock absorber 84. The proximity sensor 86 is a sensor that detects the position of the piston 80 in relation to the cap 74 as it travels through the piston receiving passageway 79. The proximity sensor 86 emits an electromagnetic field or a beam of electromagnetic radiation (infrared, for instance), and looks for changes in the field or return signal. Different proximity sensor targets demand different sensors. For example, a capacitive photoelectric sensor might be suitable for a plastic target; an inductive proximity sensor always requires a metal target. In the shown embodiment, the piston 80 is the proximity target for which the proximity sensor 86 senses changes in position thereof.

In an assembled state, as shown in FIG. 1, the piston 80 is positioned in the piston housing 78 and the piston shaft 80a is positioned through the piston shaft receiving passageway 77 in the base 76. The plurality of springs 82 are also positioned in the piston housing 78, between the base 76 and the cylinder 80b such that one end of each spring 82 touches an inner major surface of the base 76 and an opposite end of each spring 82 touches the internal major surface of the cylinder 80b. In the embodiment shown, spring retainers 83 are used at both leading and trailing ends of each spring 82. The base 76 and the cap 74 are attached to ends of the piston housing 78 using fasteners 88, and the shock absorber 84 and proximity sensor 86 are disposed along an outer major surface of the cap 74 in the shown embodiment.

The spring load assembly 70 attaches to the load bearing mechanism 62, such as the hoist shown with a housing there around (see FIGS. 1 and 2). The piston 80 operates within the piston housing 78 with both the cap 74 and the base 76 attached thereto. In the embodiment shown, the base 76 mounts to a structural support, such as the cross piece 16, and guides the piston shaft 80a up and down through the piston shaft receiving passageway 77. The shock absorber 84 and the proximity sensor 86 are disposed along the cap 74. The cap 74 and base 76 are sealed with the piston housing 78 such that the spring load assembly 70 is sealed to prevent water and other elements from entering into the piston receiving passageway 79. As a result, both the piston shaft receiving passageway 77 and the shock absorber receiving passageway 75 are sealed. For instance, a gasket may be used to seal any voids.

Operationally, when a load is applied to the piston 80, the springs 82 supporting the piston 80 deflect according to the load. For instance, load applied to the load bearing mechanism 62 is applied to the piston 80, since the piston is connected to the load bearing mechanism 62 using the eyelet or similar connection device 71. Thus, the piston 80 moves away from the cap 74 and the proximity sensor 86 detects that the piston 80 is no longer in an unloaded position. The proximity sensor 86 then sends this signal to processor 5, running software to determine, when the load bearing mechanism 62 has positioned the cleaner assembly 20 on the roof of the vehicle, which will be described further below.

The springs 82 and piston 80 are designed to support a static load and also a designed-for shock load to eliminate concern about transferring shock loads to load bearing mechanism 62 The shock absorber 84, which is mounted on the cap 74, is intended to prevent the piston 80 from accelerating the load, following a shock load which exceeds the normal static load. In other words, when the springs 82 are 'over-compressed' during a shock load event, they exceed the normal design static load, and thus will accelerate this load (rebound) as the springs 82 return to their normal static load condition. If this were to occur without the shock absorber 84, an oscillating condition would result. Such instability would be undesirable for the structure and other mechanisms.

In general, the spring load assembly 70 is intended to provide control signals based on loading conditions, and also to protect the load bearing structures and associated mechanisms.

Figure 6:
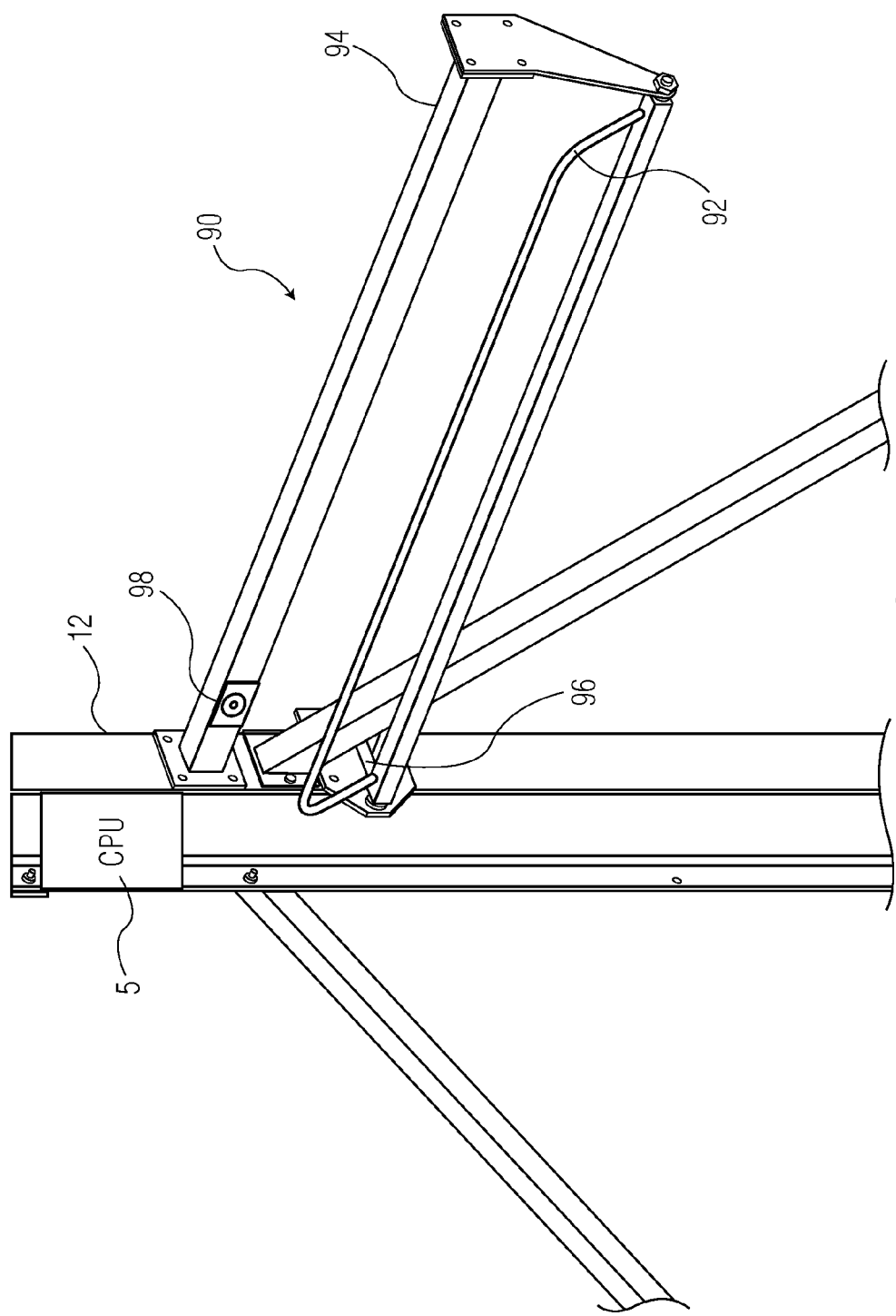
FIG. 6 is a close-up view of an activation mechanism for the embodiment shown in FIGS. 1 and 2.

Now with reference to FIGS. 1, 2, and 6, the activation mechanism 90 is shown. In the shown embodiment, the activation mechanism 90 includes a bar 92 pivotally secured to a support housing 94. The support housing 94 attaches to one of the vertical support 12. The bar 92 extends away from the support housing 94 and includes rotation devices (not shown), which allow the bar 92 to rotate back toward the support housing 94. An activation sensor 96 is disposed along the support housing 94, such that when the bar 92 is rotated toward the support housing 94, the activation sensor 96 is triggered. The activation sensor 96 connects to the processor 5. In the embodiment shown, the activation mechanism 90 is disposed along one side of the vertical support 12, such that it can be activated by a user positioned in a passenger seat of the vehicle. Additionally, the bar 92 is elongated in order to accommodate different lengths and heights of the vehicle and the position of the passenger seat in relation to the roof of the vehicle. One skilled in the art should appreciate that other devices to activate the activation sensor 96 are possible, including a lever, button, or wireless transmission device.

Now with reference to FIGS. 1 and 2, additional features are provided for the vehicle roof cleaner 1, including a roof position indicator 100, a vehicle sensor 110, and a movement indicator 120.

As shown in the exemplary embodiment of FIGS. 1 and 2, the roof position indicator 100 is a light source 102 disposed on an elongated support 104. The light source 102 provides a laser light or a focused beam of light to identify a position of the roof in relation to a front of the cleaner assembly 20. As a result, the elongated support 104 and focused light source 102 is positioned to correspond with a horizontal position of the cleaner assembly 20. Accordingly, the light source 102 is directed to a side of the vehicle such that the user in the passenger seat can view the laser light or the focused beam of light directed to a side of the vehicle or trailer, through a side view mirror.

As shown in the exemplary embodiment of FIGS. 1 and 2, the vehicle sensor 110 includes a transmitter 112 and receiver 114. The transmitter 112 directs a signal, such as light wave or sound wave, toward the receiver 114 that includes a sensor to identify the signal. the transmitter 112 and the receiver 114 are disposed on opposite base structures 24 and correspond with each other. In the shown embodiment, the vehicle sensor 110 is positioned away from the roof position indicator 100 and further away from the vertical support 12 than the vehicle sensor 110. The vehicle sensor 110 is connected to the processor 5. The vehicle sensor 110 sends a signal to the processor 5 when the receiver 114 does not detect a signal from the transmitter 112. For instance, when a vehicle is positioned between the transmitter 112 and the receiver 114, the signal is not received by the receiver 114, which then sends a signal to the processor 5.

As shown in the exemplary embodiment of FIGS. 1 and 2, the movement indicator 120 is positioned so that it is visible to the user in the passenger seat of the vehicle. The movement indicator 120 provides instructions to the user when to move or stop the vehicle during operation of the vehicle roof cleaner 1. In particular, the movement indicator 120 includes a light source 122 capable of exhibiting different indicators. In the shown embodiment, the light source 122 includes three lights having different colors, such as green, red and yellow. However, one skilled in the art should appreciate other colors or signals could be used, including arrows, symbols, or sound.

Figure 7:
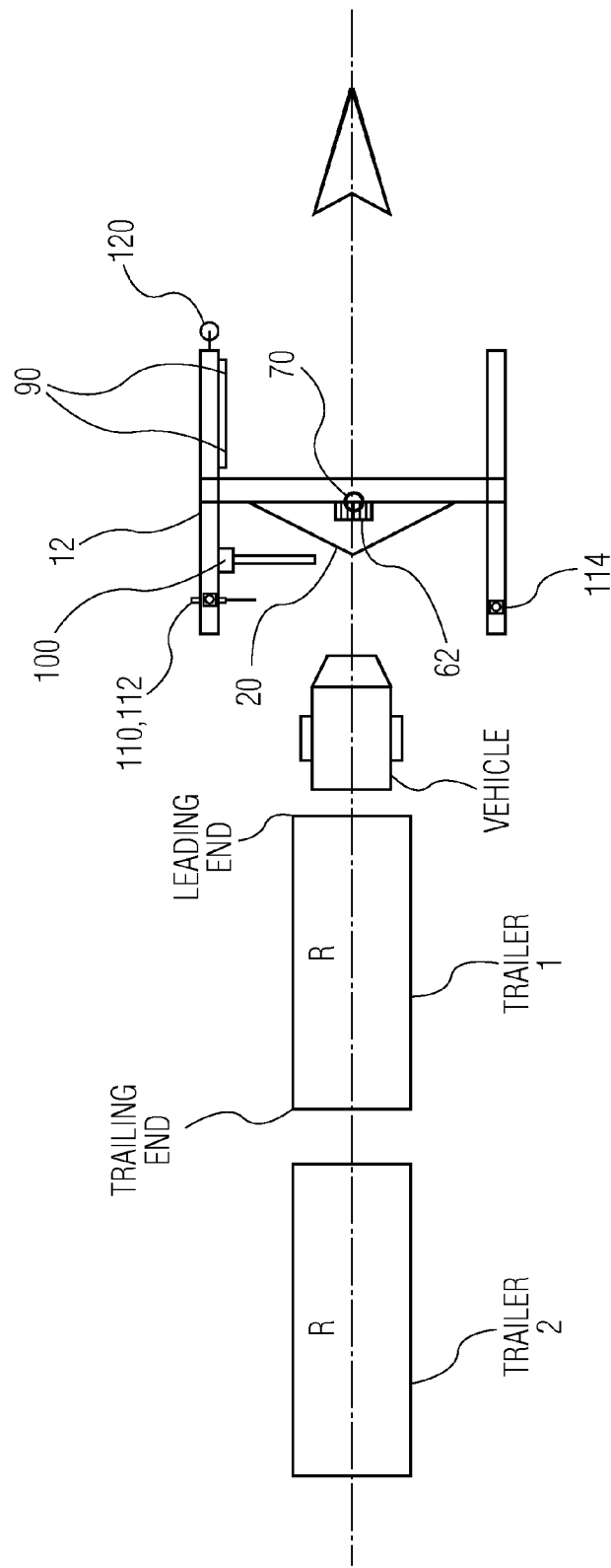
FIG. 7 is a diagram illustrating use of the embodiment shown in FIGS. 1 and 2.

Now with reference to FIGS. 1, 2, and 7, an operation of the vehicle roof cleaner 1 according to the invention will be discussed.

In general terms, an operation of the vehicle roof cleaner 1 is quite straightforward. Once the working height of cleaner assembly 20 is set by the use of the load bearing mechanism 62, all that is required is that a vehicle be slowly driven under vehicle roof cleaner 1 in the direction indicated by arrow A. Since all that is needed is relative motion between the cleaner assembly 20 and the roof of the vehicle, it is immaterial that the vehicle is in motion rather than the cleaner assembly 20, so snow and ice will be pushed off the roof and over the sides and rear of the vehicle. It should be appreciated that even with a trailer moving at only one mile per hour, it will take less than a minute to clear the roof of a typical trailer.

However, the present invention also provides an automatic means for positioning of the vehicle roof R with the cleaner assembly 20, such that the vehicle roof cleaner 1 provides and efficient way to clear snow and ice from vehicle roof R.

As the user of the vehicle enters the vehicle roof cleaner 1, between the vertical supports 12, 14, the user looks at the movement indicator 120 for instructions on how to proceed the vehicle forward.

Prior to activation of the activation mechanism 90, the movement indicator 120 will indicate that the vehicle can pull ahead beyond the vertical supports 12, 14 and the cross piece 16. In the exemplary embodiment, this is performed by a green light, which also indicates that the cleaner assembly 20 is fully retracted upward by the load bearing mechanism 62 such that there is clearance for the vehicle roof R to pass under the load bearing mechanism 62 without engagement.

Next, the user slowly moves the vehicle forward, looking through the side view mirror to spot when the roof position indicator 100 matches with a leading end of the roof. For instance, if the vehicle is a tractor trailer, the roof position indicator 100 will display a beam of light along a corner of the trailer, which indicates that a leading end of the cleaner assembly 20 is directly above the leading end of the vehicle roof R. At the same time, the vehicle sensor 110 identifies that the vehicle is positioned under the cleaner assembly 20, and sends a signal to the processor 5.

At this point, the user stops the vehicle. The processor 5 powers the activation mechanism 90, such that the bar 92 can be rotated to activate the activation sensor 96, since the user will be positioned along side of the activation mechanism 90 when the leading end of the roof is positioned with the roof position indicator 100.

The user then activates the activation mechanism 90 by pushing the bar 92 and the activation sensor 96 sends a signal to the processor 5. The processor 5 then sends a signal to the load bearing mechanism 62. The load bearing mechanism 62 then starts lowering the cleaner assembly 20 toward the vehicle roof R, and the movement indicator 120 indicates that the vehicle remain at rest. For instance, the movement indicator 120 turns red.

When the load bearing mechanism 62 is in full static position, the spring load assembly 70 is compressed, since the spring load assembly 70 is supporting the load bearing mechanism 62. As a result, the piston 80 is positioned away from the proximity sensor 86 on the cap 74, which sends a signal to the processor 5. The processor 5 sends a signal to the movement indicator 120, which then provides instructions to stay in a resting position. For instance, the movement indicator 120 turns yellow. The load bearing mechanism 62 continues to lower the cleaner assembly 20 until the cleaner assembly 20 rests on the vehicle roof R. Tension on the load bearing assembly is relieved, resulting in decompression of the spring load assembly 70.

When the spring load assembly 70 becomes uncompressed, the piston 80 slowly moves back toward the cap 74. The shock absorber 84 deters any acceleration of load in the spring load assembly 70. The proximity sensor 86 identifies a reposition of the piston 80 toward and then near the cap 74. The spring load assembly 70 sends a signal to the processor 5 to stop the load bearing mechanism 62 from further lowering the cleaner assembly 20. Additionally, the processor 5 sends a signal to the movement indicator 120, which then provides instructions to the user to proceed. For instance, the movement indicator 120 turns yellow. The user then slowly pulls the vehicle forward, while also looking at the movement indicator 120 for further instruction.

The user pulls the vehicle forward and the cleaner assembly 20 runs along the vehicle roof R until the cleaner assembly 20 moves past a trailing end of the vehicle roof R, at which time the cleaner assembly 20 drops, creating tension on the support chain 64 and the load bearing mechanism 62. Again, the spring load assembly 70 is compressed, since the spring load assembly 70 is supporting the load bearing mechanism 62. As a result, the piston 80 is positioned away from the proximity sensor 86 on the cap 74, which sends a signal to the processor 5. Since the spring load assembly 70 includes the shock absorber 84, the cleaner assembly 20 slowly drops of the vehicle roof R, and an accelerate load on height adjustment mechanism 60.

At the same time, the vehicle sensor 110 identifies if the vehicle has completely moved beyond the leading end of the cleaner assembly 20. If the vehicle has moved past the vehicle sensor 110, the processor 5 sends a signal to the load bearing mechanism 62 to raise the cleaner assembly 20. Once the cleaner assembly 20 is fully raised, the processor 5 sends a signal to the movement indicator 120 to instruct the user to proceed slowly forward. For instance, the movement indicator 120 turns green. The processor 5 and supported software resets for another vehicle.

If the vehicle is a tractor trailer or other vehicle having multiple trailers, the user can select a depress a multiple vehicle sensor 98 disposed adjacent the bar 92 of the activation mechanism 90. When depressed, the multiple vehicle sensor 98 indicates to the processor 5 that there are multiple trailers. The same steps as outlined above are followed until the cleaner assembly 20 passes a trailing end of a first vehicle roof R. The spring load assembly 70 is compressed and sends a signal to the processor 5, which sends a signal to the load bearing mechanism 62 to raise the cleaner assembly 20. The movement indicator 120 instructs the user to stop. The processor 5 sends a signal to the load bearing mechanism 62 to position the cleaner assembly 20 to a resting position that is a clearance position above known trailer heights. Once the cleaner assembly 20 is in the resting position, the movement indicator 120 instructs the user to move the vehicle slowly forward. For instance, the movement indicator 120 turns yellow.

When the second trailer disrupts the signal between the transmitter 112 and receiver 114, the vehicle sensor 110 sends a signal to the processor 5. The processor 5 sends a signal to the movement indicator 120 which instructs the user to stop the vehicle (i.e. turns red). The processor 5 also sends a signal to the load bearing mechanism 62 to the lower the cleaner assembly 20 until it rests on the vehicle roof.

The load bearing mechanism 62 continues to lower the cleaner assembly 20 until the cleaner assembly 20 rests on the vehicle roof R. Tension on the load bearing assembly is relieved, resulting in decompression of the spring load assembly 70.

When the spring load assembly 70 becomes uncompressed, the piston 80 slowly moves back toward the cap 74. The shock absorber 84 deters any acceleration of load in the spring load assembly 70. The proximity sensor 86 identifies reposition of the piston 80 near the cap 74, and sends a signal to the processor 5 to stop the load bearing mechanism 62 from further lowering the cleaner assembly 20. Additionally, the processor 5 sends a signal to the movement indicator 120, which then provides instructions to the user to proceed. For instance, the movement indicator 120 turns yellow. The user then slowly pulls the vehicle forward, while also looking at the movement indicator 120 for further instruction.

The user pulls the vehicle forward and the cleaner assembly 20 runs along the vehicle roof R until the cleaner assembly 20 moves past a trailing end of the vehicle roof R, at which time the cleaner assembly 20 drops, creating tension on the support chain 64 and the load bearing mechanism 62. Again, the spring load assembly 70 is compressed, since the spring load assembly 70 is supporting the load bearing mechanism 62. As a result, the piston 80 is positioned away from the proximity sensor 86 on the cap 74, which sends a signal to the processor 5. Since the spring load assembly 70 includes the shock absorber 84, the cleaner assembly 20 slowly drops of the vehicle roof R, and an accelerate load on height adjustment mechanism 60.

At the same time, the vehicle sensor 110 identifies if the vehicle has completely moved beyond the leading end of the cleaner assembly 20. If the vehicle has moved past the vehicle sensor 110, the processor 5 sends a signal to the load bearing mechanism 62 to raise the cleaner assembly 20. Once the cleaner assembly 20 is fully raised, the processor 5 sends a signal to the movement indicator 120 to instruct the user to proceed slowly forward. For instance, the movement indicator 120 turns green. The processor 5 and supported software resets for another vehicle.

It is to be understood that the form of this invention as shown is merely an embodiment. Various changes may be made in the function and arrangement of parts; equivalent means may be substituted for those illustrated and described; and certain features may be used independently from others without departing from the spirit and scope of the invention.

What is claimed is:

1. A vehicle roof cleaner comprising:
   a pair of vertical supports;
   an upper crossbar connecting the pair of vertical supports;
   a cleaner assembly movable along the pair of vertical supports and positionable below the upper crossbar; and
   a height adjustment mechanism connected to the cleaner assembly and having
   a load bearing mechanism, a spring load assembly having
a housing,
a piston positioned in the housing,
a plurality of springs positioned between the piston and the housing, and
a proximity sensor, and
an activation mechanism.

2. The vehicle roof cleaner according to claim 1, wherein the load bearing mechanism attaches to the cleaner assembly.

3. The vehicle roof cleaner according to claim 2, wherein the load bearing mechanism is suspended from the spring load assembly.

4. The vehicle roof cleaner according to claim 1, wherein the housing is cylindrical.

5. The vehicle roof cleaner according to claim 4, wherein the cylindrical housing includes a cap, a base, and a piston housing.

6. The vehicle roof cleaner according to claim 5, wherein the cap includes a shock absorber receiving passageway and the base includes a piston shaft receiving passageway.

7. The vehicle roof cleaner according to claim 6, wherein the piston housing is tubular having a piston receiving passageway extending there through with an internal diameter substantially equal or less than a diameter of the piston.

8. The vehicle roof cleaner according to claim 7, wherein the piston includes a piston shaft, a cylinder, and a plurality of piston rings.

9. The vehicle roof cleaner according to claim 8, wherein the cylinder is a cylindrical member having a diameter less than a diameter of the piston receiving passageway and a plurality of ridges along an outer cylindrical surface.

10. The vehicle roof cleaner according to claim 8, wherein the piston shaft extends from a lower major surface of the cylinder and includes a threaded section disposed along a distal end thereof.

11. The vehicle roof cleaner according to claim 5, further comprising a load bearing attachment extending from the base.

12. The vehicle roof cleaner according to claim 11, wherein the load bearing attachment is tubular and includes a flange at one end thereof and a shaft receiving connector at another end thereof.

13. The vehicle roof cleaner according to claim 5, further comprising a shock absorber connected to the cap.

14. The vehicle roof cleaner according to claim 13, wherein the shock absorber includes a threaded body and a resilient piston rod.

15. The vehicle roof cleaner according to claim 13, wherein the proximity sensor is positioned adjacent with the shock absorber.

16. The vehicle roof cleaner according to claim 13, wherein the proximity sensor detects a position of the piston in relation to the cap as the piston travels through the cylindrical housing.

17. The vehicle roof cleaner according to claim 13, wherein the proximity sensor induces an electromagnetic field.

18. A vehicle roof cleaner comprising:
a pair of vertical supports;
a plow assembly movable along the pair of vertical supports;
a base structure disposed on each of the pair of vertical supports and having a roof position indicator and a vehicle sensor; and
a height adjustment mechanism connected to the plow assembly and having a spring load assembly with:
a housing,
a piston positioned in the housing,
a plurality of springs positioned between the piston and the housing, and
a proximity sensor.

19. The vehicle roof cleaner according to claim 18, wherein the roof position indicator includes a light source extending from the base structure.

20. The vehicle roof cleaner according to claim 19, wherein the light source transmits a focused beam of light.

21. The vehicle roof cleaner according to claim 19, wherein the vehicle sensor includes a transmitter and receiver.

22. The vehicle roof cleaner according to claim 21, wherein the transmitter directs a signal toward the receiver having a sensor to identify the signal.

23. The vehicle roof cleaner according to claim 22, wherein the transmitter and the receiver are disposed on opposite side of the base structure and correspond with each other.

24. The vehicle roof cleaner according to claim 19, further comprising a movement indicator positioned along the base structure and having movement instructions to move or stop a vehicle.

25. The vehicle roof cleaner according to claim 24, wherein the movement indicator includes a light source exhibiting different indicators.

26. The vehicle roof cleaner according to claim 25, wherein the light source includes three lights having different colors.

* * * * *